J. WILKINSON.
GEARING.
APPLICATION FILED MAY 9, 1919.
1,359,853.
Patented Nov. 23, 1920.
2 SHEETS—SHEET 2.
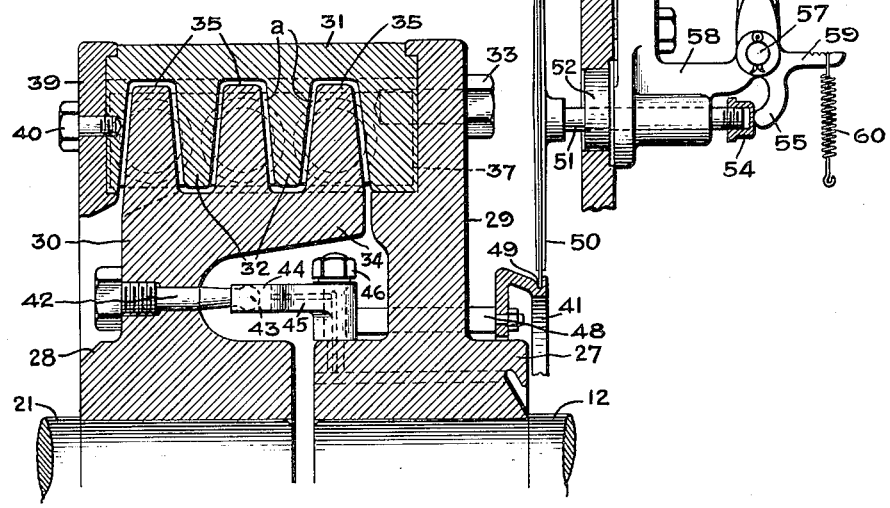
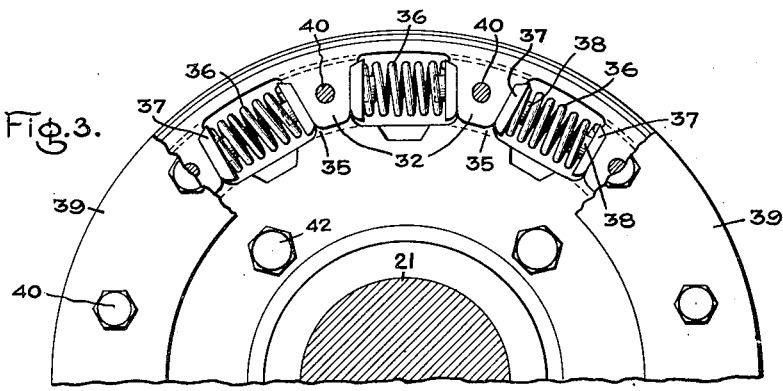
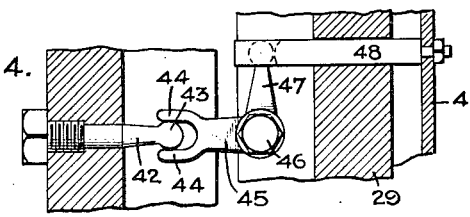
Inventor:
James Wilkinson,
by Albert G. Davis
His Attorney.

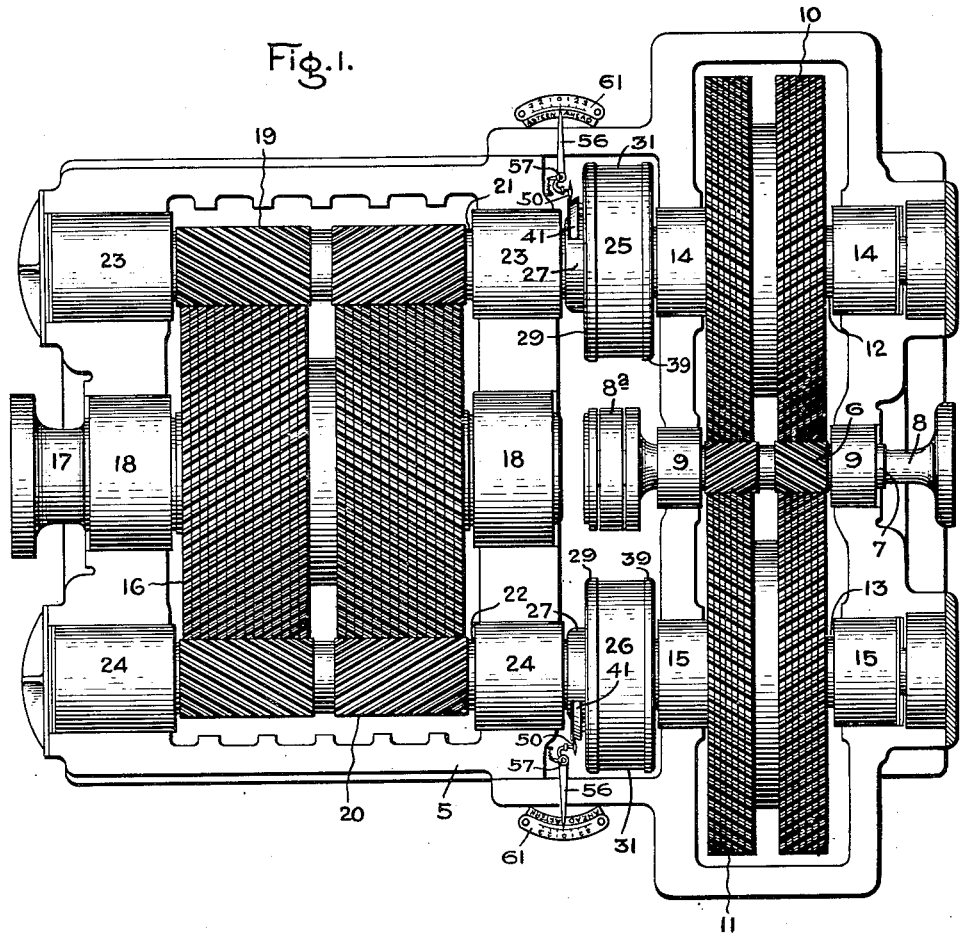

UNITED STATES PATENT OFFICE.

JAMES WILKINSON, OF SCHENECTADY, NEW YORK, ASSIGNOR TO GENERAL ELECTRIC COMPANY, A CORPORATION OF NEW YORK.

GEARING.

1,359,853.     Specification of Letters Patent.     Patented Nov. 23, 1920.

Application filed May 9, 1919. Serial No. 295,981.

*To all whom it may concern:*

Be it known that I, JAMES WILKINSON, a citizen of the United States, residing at Schenectady, in the county of Schenectady, State of New York, have invented certain new and useful Improvements in Gearing, of which the following is a specification.

The present invention relates to gearing of the type in which power is transmitted between a high speed pinion and a low speed gear wheel through two or more sets of intermediate gear wheels each set comprising a high speed gear wheel meshing with the high speed pinion and a low speed pinion meshing with the low speed gear wheel.

The more general application of such gearing is for speed reduction and hereinafter the invention is particularly described as a reduction gearing but it will be understood that it is also applicable to speed multiplication. A gearing arrangement as referred to above constitutes a double reduction gearing and it is well adapted for use in connection with elastic fluid turbines to reduce the speed and may be used for ship propulsion and other purposes.

For a consideration of what I believe to be novel and my invention, attention is directed to the accompanying description and the claims appended thereto.

In the drawing, Figure 1 is a plan view of a gearing embodying my invention; Fig. 2 is a radial view of a spring coupling; Fig. 3 is a side view partly broken away of a part of a coupling as shown in Fig. 2, and Fig. 4 is a detail.

Referring to the drawing, 5 indicates the lower half of a gear casing in which are bearings for the shafts of the gearing. The gearing comprises a high speed pinion 6 mounted on a quill shaft 7 and driven by a flexible driving shaft 8 which extends through quill shaft 7 and is coupled thereto by a suitable axially adjustable coupling 8ª. Quill shaft 7 is carried in bearings 9 and meshing with it on opposite sides are high speed gear wheels 10 and 11 mounted on shafts 12 and 13 carried in bearings 14 and 15 respectively. This forms the high speed end of the gearing and in the present instance it is shown as being of the double helical type as such type of gearing is well adapted for high speed work. Other types of gearing may be used however if found desirable. The low speed end of the gearing comprises low speed gear wheel 16 mounted on a shaft 17 carried in bearings 18, and two low speed pinions 19 and 20, mounted on shafts 21 and 22 carried in bearings 23 and 24 respectively. The low speed end of the gearing is also shown as being of the double helical type although it may be of other type if found desirable. Also in the present instance the two high speed gear wheels 10 and 11 and the low speed gear wheel 16 are shown as being of a flexible type, comprising a plurality of disks or laminæ fixed together at their central portions and slightly spaced apart at their peripheries to permit of lateral flexure under excessive tooth pressure.

High speed gear wheel 10 and low speed pinion 19 form one set of intermediate gear wheels and high speed gear wheel 11 and low speed pinion 20 form another set of intermediate gear wheels and the shafts 12 and 21 and the shafts 13 and 22 of the intermediate gear wheels are connected together by torsionally and axially adjustable spring couplings 25 and 26 respectively.

Couplings 25 and 26 may be of any suitable type but preferably I employ a coupling as shown in Figs. 2, 3 and 4. Referring to these figures, the adjacent shaft ends which may be those of either shafts 12 and 21 or shafts 13 and 22 are provided with hubs 27 and 28 carrying coupling flanges 29 and 30. Carried by flange 29 is an outer annular member 31 on the inner surface of which are radially inwardly projecting teeth 32. Teeth 32 are arranged in circular rows extending around the member 31 and the teeth of each row are spaced a suitable distance apart as shown in Fig. 3. There may be as many rows of teeth 32 as found desirable, four rows being shown in the present instance and such rows are spaced apart axially a suitable distance. Annular member 31 may be formed integral with flange 29 or it may be formed as shown as a separate member bolted to flange 29 by bolts 33. This latter arrangement is preferable as it facilitates manufacturing and assembling. Carried by flange 30 and preferably formed integral therewith is an inner annular member 34 having a row or rows of teeth 35, the teeth of each row being spaced apart to correspond to the spacing of teeth 32, and the row or rows being spaced axially to fit between the rows of teeth 32. Teeth 35 are narrower in axial width than the spaces between rows of teeth 32 so as to leave a clearance as indicated at $a$ in Fig. 1, which clearance is sufficiently great to permit axial adjustments taking place. Teeth 32 and 35 of the various rows are axially alined and in the spaces between the teeth are compression springs 36 which bear at their ends against spring shoes 37. Spring shoes 37 are preferably in the form of rectangular plates of such size that they engage the ends of the springs and the teeth of the two members 31 and 34. In other words spring shoes 37 are of a length equal to the axial width of the coupling. In the present instance there are three rows of springs 36 since there are three rows of teeth 35. Spring shoes 37 have short projecting studs 38 which serve to center springs 36 and hold them in place. On the end of member 31 remote from flange 29 is a retaining ring 39 held in place by bolts 40, such ring serving to close the side of the coupling to hold the adjacent rows of springs in place and retain oil in the coupling. As is obvious, a coupling as shown in Figs. 2 and 3 will permit the shafts which it connects to adjust themselves axially relatively to each other and also adjust themselves circumferentially relatively to each other.

By the use of a coupling as just described between the set of intermediate gear wheels 10 and 19 and between the set of intermediate gear wheels 11 and 20 it will be clear that the gear wheels of each set can adjust themselves circumferentially relatively to each other in either direction and that they can also adjust themselves axially relatively to each other. As is well understood sufficient clearances are provided between the various gear wheels and the adjacent bearings to permit of the desired amount of axial play.

With a general gearing arrangement as shown in Fig. 1, when the load is equally divided among the intermediate sets of gear wheels the high speed pinion is balanced between the high speed gear wheels and as a result floats in its bearings. However, in actual operation the division of load is not always exactly equal there being variations which cause the pinion to vibrate in its bearings the pinion bearing downward in its bearings at one time and upward at another time, and this may result in excessive wear and damage to both the bearings and the gear teeth. To overcome this difficulty, I set the springs 36 of one coupling, for example, the coupling 25, under greater pressure than the springs 36 of the other coupling so as to unbalance the pinion torque and keep the high speed pinion shaft at all times pressing against its bearings. This results, of course, in a slight inequality in the loads carried by the respective intermediate sets of gear wheels but the inequality need not be great and in actual practice is a negligible quantity. By way of example but not as a limitation of my invention, in the case of a gearing intended to transmit 2500 H. P. the springs 36 of the one coupling may be set to have an initial tension equivalent to say 75 H. P. while the springs 36 of the other coupling may be set with zero tension. With this setting then the intermediate set of gear wheels associated with the first coupling will transmit all the load up to 75 H. P. and for loads above that point will transmit 75 H. P. more than the set of gear wheels associated with the other coupling. Under these circumstances when driving in one direction the high speed pinion shaft will always bear downward in its bearings and when driving in the other direction it will always bear upward therein.

It is desirable to know just what division of power is taking place among the intermediate sets of gear wheels and for this purpose I provide a torsion meter associated with each coupling which indicates at all times the power being transmitted by the sets of gear wheels with which the coupling is associated.

When a spring coupling as shown is transmitting power springs 36 will yield which results in one shaft turning circumferentially relatively to the other and the amount of this relative angular movement will be indicative of the power being transmitted. I accordingly provide an indicator for measuring such angular movements which indicator comprises a torsion indicator ring 41 to which at spaced points around it, are attached motion transmitting means for giving to ring 41 axial movements proportional to the relative angular movements of the shafts. Each motion transmitting means comprises a projection 42 provided with a head 43 which fits between furcations 44 on the end of an arm 45 which forms one arm of a bell crank lever. The bell crank lever is pivotally mounted at its elbow on a stud 46 projecting from hub 27 and its other arm 47 engages in a slot at one end of a link 48 the other end of which is fastened to torsion indicator ring 41. By providing a number of these motion transmitting means the ring 41 is evenly and firmly supported and will move axially in a plane parallel to it, no twisting of the ring taking place. A suitable amount of axial play is provided between head 43 and the bottom of furcations 44 to permit of axial relative movements of the shafts without disturbing the motion transmitting means. As will be clear whenever the shafts move circumferentially relatively to each other the projections 42 will positively turn the bell crank l levers comprising arms 45 and 47 in one direction or the other, thereby moving the ring 41 axially.

In the periphery of ring 41 is a groove 49 in which is located the edge of a fiber wheel 50. Fiber wheel 50 has a shaft 51 which is mounted in an eccentric bearing 52 to which is attached a hand lever 53. By turning hand lever 53 the eccentric bearing 52 is turned to move fiber wheel 50 out of and into engagement with torsion indicator ring 41.

The end of shaft 51 remote from the fiber wheel is provided with an adjustable cap 54 which engages an arm 55 on the lower end of the indicator needle 56 which needle is pivotally mounted on the shaft 57 carried by a stationary bracket 58. Extending at a right angle to indicator needle 56 and formed integral therewith is a lever arm 59 to which is attached an adjustable spring 60 which spring serves at all times to hold arm 55 in engagement with cap 54. The indicator needle 56 moves over dial 61 on which are suitable figures to indicate the direction and amount of torsional movement in the coupling.

In the case where the gearing is used for ship propulsion purposes this indicator dial would indicate either astern or ahead movements.

With the above described arrangement it will be seen that the amount of power and the direction will at all times be shown on the indicator dial.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. In a gearing, the combination of a high speed pinion, a low speed gear wheel, a plurality of sets of intermediate gear wheels through which power is transmitted from said pinion to said low speed gear wheel, each set comprising a high speed gear wheel meshing with the high speed pinion and a low speed pinion meshing with the low speed gear wheel, and a torsional coupling connecting the gear wheels of each set together, said couplings being so constructed and arranged that one offers a greater resistance to torsional movements than another.

2. In a gearing, the combination of a high speed pinion, a low speed gear wheel, a plurality of sets of intermediate gear wheels through which power is transmitted from said pinion to said low speed gear wheel, each set comprising a high speed gear wheel meshing with the high speed pinion and a low speed pinion meshing with the low speed gear wheel, and a torsional coupling connecting the gear wheels of each set together, each torsional coupling comprising interleaving parts and spring members between said parts, the spring members of one coupling being set under greater pressure than those of another.

3. In a gearing, the combination of a driving gear wheel, a driven gear wheel, two sets of intermediate speed gear wheels which transmit power between the driving and driven gear wheels, axially alined shafts for the gear wheels of each intermediate set, and torsional couplings connecting the shafts of each intermediate set together, one of said couplings being set with a greater initial tension than the other.

In witness whereof, I have hereunto set my hand this 8th day of May, 1919.

JAMES WILKINSON.